US008290954B2

(12) United States Patent
Baker et al.

(10) Patent No.: US 8,290,954 B2
(45) Date of Patent: Oct. 16, 2012

(54) RESOURCE NAME RECONCILIATION IN A CONFIGURATION DATABASE

(75) Inventors: Ronald B. Baker, Austin, TX (US); Robert L. Nielsen, Chapel Hill, NC (US); Ling-Ching W. Tai, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/816,074

(22) Filed: Jun. 15, 2010

(65) Prior Publication Data

US 2010/0293205 A1 Nov. 18, 2010

Related U.S. Application Data

(63) Continuation of application No. 11/459,566, filed on Jul. 24, 2006.

(51) Int. Cl.
G06F 7/00 (2006.01)

(52) U.S. Cl. ........................................ 707/736
(58) Field of Classification Search .................. 707/736, 707/999.102
See application file for complete search history.

(56) References Cited

U.S. PATENT DOCUMENTS

| | | | |
|---|---|---|---|
| 5,423,023 A | 6/1995 | Batch et al. | |
| 5,706,501 A | 1/1998 | Horikiri et al. | |
| 5,765,154 A | 6/1998 | Horikiri et al. | |
| 6,004,276 A | 12/1999 | Wright et al. | |
| 6,173,418 B1 | 1/2001 | Fujino et al. | |
| 6,418,447 B1 * | 7/2002 | Frey et al. | 1/1 |
| 6,442,685 B1 | 8/2002 | French et al. | |
| 6,665,662 B1 | 12/2003 | Kirkwood et al. | |
| 6,976,211 B2 | 12/2005 | Lection et al. | |
| 7,188,138 B1 | 3/2007 | Schneider | |
| 7,653,684 B2 | 1/2010 | Bendapudi et al. | |
| 2002/0087665 A1 * | 7/2002 | Marshall et al. | 709/220 |
| 2002/0194154 A1 * | 12/2002 | Levy et al. | 707/1 |
| 2003/0135606 A1 | 7/2003 | Goodwin et al. | |
| 2004/0193462 A1 | 9/2004 | Beasley | |
| 2004/0260693 A1 | 12/2004 | Chen et al. | |
| 2004/0267749 A1 | 12/2004 | Bhat et al. | |
| 2005/0033795 A1 | 2/2005 | Wood | |
| 2005/0278339 A1 | 12/2005 | Petev et al. | |
| 2006/0004875 A1 | 1/2006 | Baron et al. | |
| 2006/0212924 A1 * | 9/2006 | Xie et al. | 726/1 |

(Continued)

OTHER PUBLICATIONS

Robert Van Der Linden, The ANSA Naming Model, Report, ANSA Architecture for Open Distributed Systems, Jul. 15, 1993, pp. 1-64, Architecture Projects Management Ltd., Poseidon House, Cambridge, United Kingdom.

(Continued)

Primary Examiner — Jensen Hu
(74) Attorney, Agent, or Firm — Lee Law, PLLC; Christopher B. Lee

(57) ABSTRACT

A Configuration Management DataBase (CMDB) is utilized to reconcile names of enterprise computer resources in a Configuration Management Database (CMDB). Steps taken include creating a resource that belongs to a class that has multiple naming rules; in response to determining that more than one set of naming attributes is provided by the multiple naming rules, generating a set of valid names, in a priority order, for the resource; and correlating different names for the resource by, in accordance with the priority order, assigning one name for the resource to be a master name and assigning all other names for the resource to be alias names.

24 Claims, 11 Drawing Sheets

U.S. PATENT DOCUMENTS

2006/0225032 A1    10/2006    Klerk et al.

OTHER PUBLICATIONS

United States Patent and Trademark Office, Office Action for U.S. Appl. No. 11/459,566, Jun. 4, 2008, pp. 1-22, Alexandria, VA, USA.

United States Patent and Trademark Office, Office Action for U.S. Appl. No. 11/459,566, Oct. 27, 2008, pp. 1-27, Alexandria, VA, USA.

United States Patent and Trademark Office, Office Action for U.S. Appl. No. 11/459,566, Oct. 16, 2009, pp. 1-20, Alexandria, VA, USA.

United States Patent and Trademark Office, Office Action for U.S. Appl. No. 11/459,566, Apr. 7, 2010, pp. 1-23, Alexandria, VA, USA.

United States Patent and Trademark Office, Office Action for U.S. Appl. No. 11/459,566, Feb. 2, 2011, pp. 1-20, Alexandria, VA, USA.

United States Patent and Trademark Office, Office Action for U.S. Appl. No. 11/459,566, Jul. 18, 2011, pp. 1-23, Alexandria, VA, USA.

United States Patent and Trademark Office, Office Action for U.S. Appl. No. 12/816,003, Mar. 4, 2011, pp. 1-15, Alexandria, VA, USA.

United States Patent and Trademark Office, Office Action for U.S. Appl. No. 12/816,003, Aug. 12, 2011, pp. 1-12, Alexandria, VA, USA.

United States Patent and Trademark Office, Office Action for U.S. Appl. No. 11/459,566, Jan. 10, 2012, pp. 1-29, Alexandria, VA, USA.

United States Patent and Trademark Office, Office Action for U.S. Appl. No. 12/816,003, Jan. 6, 2012, pp. 1-20, Alexandria, VA, USA.

United States Patent and Trademark Office, Notice of Allowance for U.S. Appl. No. 12/816,003, May 24, 2012, pp. 1-12, Alexandria, VA, USA.

United States Patent and Trademark Office, Notice of Allowance for U.S. Appl. No. 111459,566, Jun. 11, 2012, pp. 1-11, Alexandria, VA, USA.

* cited by examiner

| ACTIVITY# | ACTIVITIES | VALID NAMES | SELECTED MASTER |
|---|---|---|---|
| 1 | ADDCS(MMTS1) | MMTS1 | MMTS1 |
| 2 | ADDOS(SUPERIOR=MMTS1, OS=(WINXP)) | MMTS1/WINXP | MMTS1/WINXP |
| 3 | ADDOS(SUPERIOR=MMTS1, OS=(WINXP, SYSGUID1)) | MMTS1/WINXP SYSGUID1 | MMTS1/WINXP |
| 4 | ADDOS(SUPERIOR=MMTS1, OS=(HOSTA)) | MMTS1/HOSTA | MMTS1/HOSTA |
| 5 | ADDCS(UUID1) | UUID1 | UUID1 |
| 6 | ADDOS(SUPERIOR=UUID1, OS=(WINXP)) | UUID1/WINXP | UUID1/WINXP |
| 7 | ADDOS(SUPERIOR=UUID1, OS=(WINXP, SYSGUID1)) | UUID1/WINXP SYSGUID1 | MMTS1/WINXP |
| 8 | ADDOS(SUPERIOR=UUID1, OS=(HOSTA)) | UUID1/HOSTA | UUID1/HOSTA |
| 9 | ADDCS(MMTS1, UUID1) | MMTS1, UUID1 | MMTS1 |
| 10 | ADDOS(SUPERIOR=UUID1, OS=(HOSTB)) | MMTS1/HOSTB | MMTS1/HOSTB |
| 11 | ADDOS(SUPERIOR=UUID1, OS=(HOSTB, SYSGUID1)) | MMTS1/HOSTB SYSGUID1 | MMTS1/WINXP |
| 12 | ADDOS(SUPERIOR=UUID1, OS=(WINXP, HOSTA)) | MMTS1/WINXP MMTS1/HOSTA | MMTS1/WINXP |

402

MASTER/ALIAS TABLE ("ME_ALIAS TABLE") — 308

| ALIAS | MASTER | SUPERIOR | NAMING RULE PRTY |
|---|---|---|---|
| MMTS1 | MMTS1 | - | 0 |
| MMTS1/WINXP | MMTS1/WINXP | MMTS1 | 1 |
| SYSGUID1 | MMTS1/WINXP | - | 0 |
| MMTS1/HOSTA | ~~MMTS1/HOSTA~~ MMTS1/WINXP | MMTS1 | 2 |
| UUID1 | ~~UUID1~~ MMTS1 | - | ~~0~~ |
| UUID1/WINXP | ~~UUID1/WINXP~~ MMTS1/WINXP | ~~UUID1~~ MMTS1 | ~~1~~ |
| UUID1/HOSTA | ~~UUID/HOSTA~~ ~~MMTS1/HOSTA~~ MMTS1/WINXP | ~~UUID1~~ MMTS1 | ~~2~~ |
| MMTS1/HOSTB | ~~MMTS1/HOSTB~~ MMTS1/WINXP | ~~MMTS1~~ | ~~1~~ |

404

MANAGED ELEMENT TABLE

| NAME | CLASS | OTHER ATTRIBUTES |
|---|---|---|
| MMTS1 | COMPUTERSYSTEM | ... |
| MMTS1/WINXP | OPERATINGSYSTEM | ... |
| ~~MMTS1/HOSTA~~ | ~~OPERATINGSYSTEM~~ | ... |
| ~~UUID1~~ | ~~OPERATINGSYSTEM~~ | ... |
| ~~UUID1/WINXP~~ | ~~OPERATINGSYSTEM~~ | ... |
| ~~UUID1/HOSTA~~ | ~~OPERATINGSYSTEM~~ | ... |
| ~~MMTS1/HOSTB~~ | ~~OPERATINGSYSTEM~~ | ... |

FIG. 4

| SCENARIOS | AUTOMATIC CORRELATION POSSIBLE? |
|---|---|
| (1, 2, 3) | NO |
| (1, 2, 4) | YES, BUT REQUIRES A FIXDUPLICATES PROCESSING. FAILED TO CORRELATE INITIALLY BUT CAN BE FIXED WHEN 4TH NAMING ATTRIBUTE COMBINATION IS USED IN CREATING A COMPUTERSYSTEM. |
| (1, 3, 4) OR (1, 2, 5) OR (1, 2, 6) | NO (PARTIAL CORRELATION). FAILED TO CORRELATE INITIALLY AND PROVIDES ONLY PARTIAL FIX WHEN 4TH OR 5TH OR 6TH NAMING ATTRIBUTE COMBINATION IS USED IN CREATING A COMPUTERSYSTEM. |
| 1 OR 2 OR 3 OR 4 OR 5 OR 6, FOLLOWED BY 7 | YES, BUT REQUIRES FIXDUPLICATES PROCESSING |
| (4, 6, 5) OR (5, 4, 6) OR (6, 5, 4) OR (4, 5, 6) | YES |
| 7, FOLLOWED BY 1 OR 2 OR 3 OR 4 OR 5 OR 6 OR ANY NAMING ATTRIBUTE COMBINATIONS | YES |

FIG. 5

RESOURCE NAME RECONCILIATION IN A CONFIGURATION DATABASE

RELATED APPLICATIONS

This application is a continuation of and claims priority to and claims the benefit of U.S. patent application Ser. No. 11/459,566 titled "RESOURCE NAME RECONCILIATION IN A CONFIGURATION DATABASE," which was filed in the U.S. Patent and Trademark Office on Jul. 24, 2006, and which is incorporated herein by reference in its entirety; and this application is related to concurrently filed U.S. patent application Ser. No. 12/816,003, titled "RESOURCE NAME RECONCILIATION IN A CONFIGURATION DATABASE," which is incorporated herein by reference in its entirety and which is also a continuation of U.S. patent application Ser. No. 11/459,566 titled "RESOURCE NAME RECONCILIATION IN A CONFIGURATION DATABASE," which was filed in the U.S. Patent and Trademark Office on Jul. 24, 2006.

BACKGROUND

The present invention relates in general to the field of computers and similar technologies, and in particular to software utilized in this field.

One of the primary goals for a Configuration Management Database (or CMDB) is to provide support for configuration items (or resources) as defined by the IT Infrastructure Library (or ITIL). Chapter 7 of the ITIL Service and Support specification, which is herein incorporated by reference in its entirety, gives the details of this support.

Along with representing and storing relationships between resources, another important purpose of the CMDB is to provide a correlation mechanism between resources. For example, two management products may discover a single computer system, and yet call them different names. Thus, it is important to represent this single computer system as a single resource. In order to foster consistent identification of resources in the CMDB, a CMDB Common Data Model (CDM) formally defines the ways in which each type of resource (each class) is identified through the use of naming rules. These rules list the potential attributes that provide identifying characteristics, the combination of those attributes that are needed to identify the resource, and what the context is that makes that combination unique. For example, there might be a rule that says that combining "Manufacturer," "MachineType," "Model," and "SerialNumber" give a unique identification of a Computer System. For some types of resources, a simple combination of attributes is not sufficient to uniquely identify a resource without some other context. For example, the drive letter (like "C:") of a logical disk is not sufficient to give a unique identification. However, the drive letter is unique within the context of an Operating System instance. This means that the naming rule of a logical disk uses an Operating System as the naming context, which is referred to as a "superior". Adding a superior to a naming rule addresses the unique identification problem. However, it introduces additional challenge in name reconciliation process. That is, when the name of a superior is changed, all resources named after the superior must also be identified and changed.

Some management products may have a limited view of a resource and be unable to obtain all attributes needed by a naming rule. To accommodate these management products, CMDB must support multiple naming rules for a number of classes. This allows different management products that discover the same resource to use different naming rules to name the same resource. That is, some classes of resources will have multiple valid names. CMDB must tolerate and facilitate the correlation of multiple names of the same resource. When the naming rules overlap, CMDB also needs to detect that a newly discovered resource already exists in the CMDB as long as at least one of the naming rules used to name the newly discovered resource was used previously, and fix potential duplicate name instances.

While there are many known solutions to the naming problem in general, and even some that specify "rules" for how the name is formed (such as the X.500 standard from OSI or the CIM standard from the DMTF), these solutions only determine how the name is formed, and not how multiple aliases for the name are formally correlated. That is, existing solutions do not deal with correlating multiple aliases for the same managed resource.

BRIEF SUMMARY

The present invention deals with the correlation and aliasing aspects of resources that are managed by a configuration database. In one embodiment, the present invention includes generating a list of all valid names for a resource that is managed by a resource configuration database, wherein the resource belongs to a class of resources that have multiple naming rules, and wherein the valid names have a validity priority order.

In another embodiment, an inventive method includes determining if a resource, which is managed by a resource configuration database, has multiple valid names; and in response to determining that the resource has multiple valid names, delegating one of the valid names to be a master name for the resource, and delegating any remaining valid names to be alias names for the resource.

In another embodiment, an inventive method for reconciling names, of enterprise computer resources, in a Configuration Management Database (CMDB), includes: creating a resource that belongs to a class that has multiple naming rules; in response to determining that more than one set of naming attributes is provided by the multiple naming rules, generating a set of valid names, in a priority order, for the resource; and correlating different names for the resource by, in accordance with the priority order, assigning one name for the resource to be a master name and assigning all other names for the resource to be alias names.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 4 illustrates an activity list, a Master/Alias table, and a Managed Element table that describe exemplary steps taken to reconcile a name of resource that is managed by the CMDB;

FIG. 5 is a chart showing which scenarios will succeed and which will fail in resource naming correlations;

DETAILED DESCRIPTION

The present invention provides for a computer-implementable method, system and computer-usable medium for managing reconciling resource names in a Configuration Management Database (CMDB). The CMDB data model supports multiple naming rules for a number of classes. In creating a resource that belongs to a class that has multiple naming rules, if more than one set of naming attribute is provided, a set of valid names is generated in a priority order. The CMDB will correlate these different names, where one with the highest priority is the master, and the rest are aliases. The CMDB can then check to see if multiple name instances of the same resource already exist in the CMDB database, but are not labeled as aliases of the same master. If so, the CMDB will select one of the name instances as the master and the other duplicate name instances as aliases. The rule for naming resources is that the master name is either the first name instance created for the resource, or alternatively the master name is the name that is created with the highest priority naming rule. If any duplicate name instance is a superior naming context of any resources stored in the Master/Alias table, CMDB will reconstruct a valid name for these resources using the newly selected master. CMDB will also clean up its database by replacing all references to aliases with their new masters and removing all duplicate entries from its core tables. Among other advantages, the present invention allows the automatic correlation of disparate naming techniques based on configurable naming rules. Instructions found in each embodiment of a computer-usable medium may be deployed from a service provider to a user. This deployment may be made in an "on-demand" basis as described herein.

Figure 1:
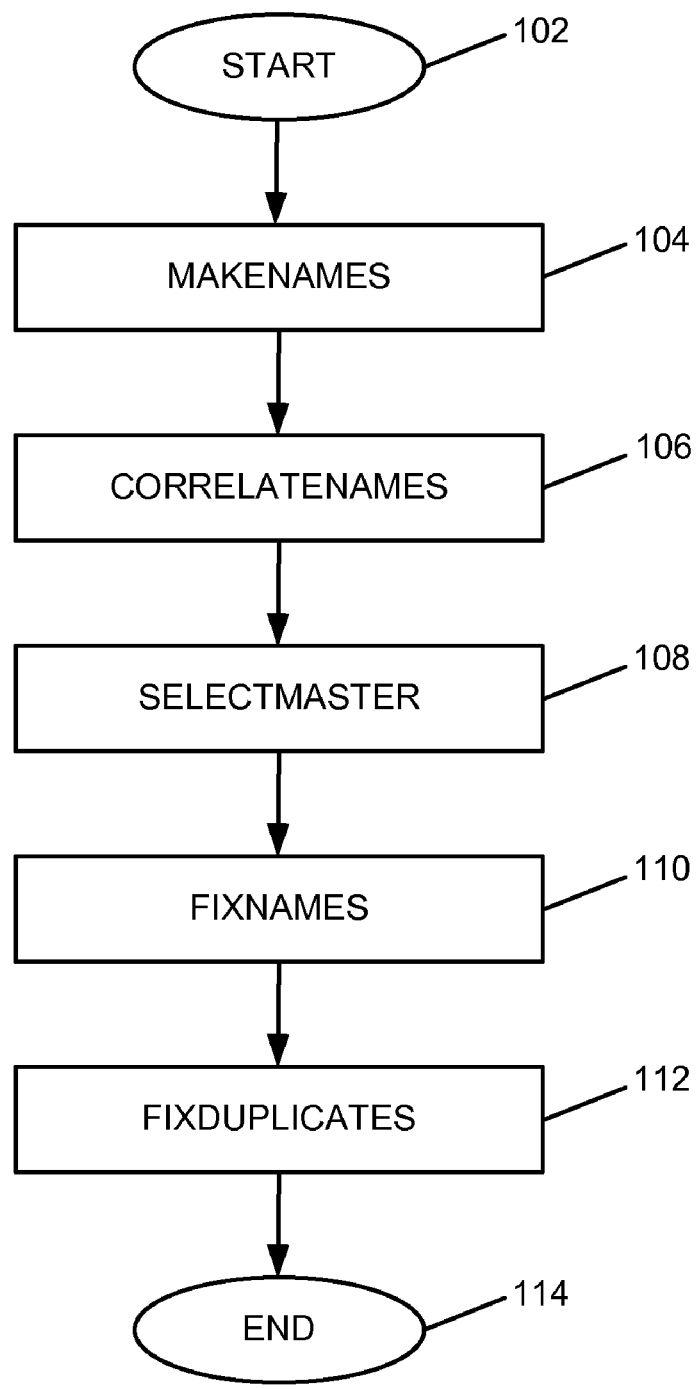
FIG. 1 is a flow-chart showing a simplified overview of steps taken in the present invention to reconcile named managed by a Configuration Management Database (CMDB)
Figure 2:
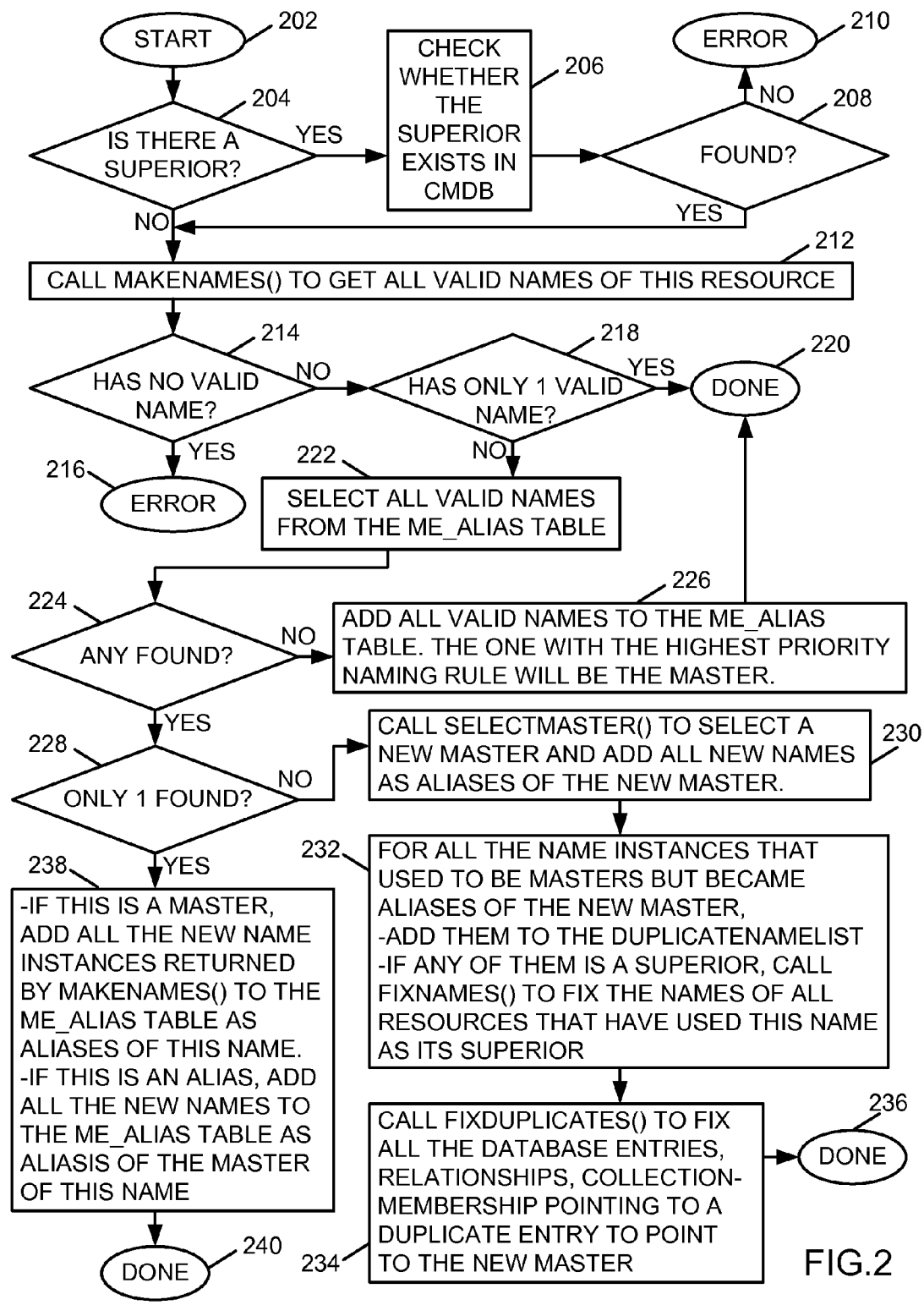
FIG. 2 provides additional detail of the steps described in FIG. 1.

With reference now to the figures, and in particular to FIG. 1, a simplified flow-chart, corresponding with the above described steps and those found below in FIG. 2, is presented. That is, the flow-chart of FIG. 1 shows exemplary steps taken by the present invention to reconcile names of resources that are managed by a CMDB. After initiator block 102, valid names for all resources are constructed, as suggested by the method "makeNames" in block 104. Note that some of these created names, while initially valid, will later be deemed duplicate because of a change to a superior, or due to a new master name having been selected during the name correlation processing using a higher priority naming rule. As suggested by the method shown in block 106, a Master/Alias table (such as a Master/Alias table 308 shown and described below in FIGS. 3 and 5) is used to find existing name instances, and to determine whether those name instances have been labeled as aliases. Continuing to block 108, one of the located name instances is selected to be a master. The master name instance may either be a name instance that used a higher priority rule than the rule used to create the non-master (alias) name of a same resource, or the master name instance may be a name instance that was simply the first to be created for a particular resource. At this stage, any duplicates (old master names created for a same resource before the name correlation) are recorded.

At block 110, names for resources (whose names have used an old master name as their naming context) are reconstructed using a correct master name for their superior (as illustrated and described below in FIG. 5). Finally, as described in block 112, relationship instances, collection-memberships, etc. are fixed (replacing the alias name for the master name wherever applicable), and duplicate name instances (shown in a Duplicate Name List 316 in FIG. 3) are deleted from main CMDB tables. The process ends at terminator block 114.

Additional detail of the present invention is now provided in FIG. 2. After initiator block 202, a query is made (query block 204) as to whether there is a superior (higher level naming context as discussed above, such as a computer system being a superior to an O/S, an O/S being a superior to an application, etc.) for a particular resource (which may be either a hardware resource or a software resource of an enterprise). If a superior exists, the a check of the CMDB tables is made to determine if the CMDB "knows" about the superior (block 206). If the superior is NOT found in the CMDB (query block 208), then there is an error (error block 210), since there should have been a record that was created in the CMDB for the superior when the CMDB first recognized/managed that particular resource.

If query block 204 determines that there is NOT a superior for the particular resource, then a call to "makeNames( )" is made to get all valid names for this particular resource (block 212). The method "makeNames" constructs all the valid names depending on attributes, context, and the naming rule of the resource to be created. Each naming rule uses a different set of attributes to derive a name. In creating a resource, at least one of the attribute sets used in deriving a name must be specified. If insufficient data is provided, the CMDB reconciliation will reject the create request. If more than one valid name is generated, one with the highest priority is the master and the rest are aliases. If the method "makeNames" is unable (query block 214) to create a valid name (e.g., due to a lack of required data needed by a particular naming rule), then an error message is generated (error block 216). Otherwise, a check is made as to whether the resource being named has only one valid name (query block 218). If so, then the process is finished (terminator block 220). Otherwise, all valid names for the resource are selected (block 222) from the ME_ALIAS table (i.e., Master/Alias table 308 depicted below in FIG. 3). That is, after getting all valid names of a resource from the makeNames( ) routine, the CMDB name reconciliation process will consult the Master/Alias table 308 to determine whether there are other name instances of the newly discovered resource have already existed in CMDB. If none are found (query block 224), then all valid names are added to the Master/Alias table 308. The valid name that used a naming rule that had the highest priority will be set as the master name for that resource, and the other valid names are set as alias names for that resource. A rule is determined to have the highest priority if it has been selected as such, by a CMDB manager, either according to complying with pre-set naming rules or by the CMDB manager manually choosing a particular rule to have the highest priority for a particular situation or for a particular resource. The process thus ends at terminator block 220.

If valid names WERE found in the Master/Alias table 308, then a check is made as to how many were found (query block 228). If more than one valid names were found in the Master/Alias table 308, then the method "selectMaster( )" is called to select a new master and to add all new names as aliases of the new master (block 230). That is, from all the name instances found in CMDB for the newly discovered resource, "selectMaster( )" selects a new master in the following manner. If all name instances existed in CMDB were aliases of the same master, select that master as the new master. If all name instances existed in CMDB were aliases of more than one master, select the master name created using the naming rule of the highest priority as the master of all name instances.

As a result of this processing, some existing master name instances may now become aliases of the newly selected master (block 232). These obsolete master name instances will be added to the Duplicate Name List 316 shown in FIG. 3. All the database entries (i.e. relationship, collection-membership, managed_element table, and resource-specific tables, such as a Computer System table, an Operating System table, a Software Installation table, etc.) related to these names will be fixed during the fixDuplicates( ) processing describe below in block 234. As described in block 232, if any of the names is a superior, the "fixNames( )" is called to fix the names of all resources that have used this name as its superior. That is, the method "fixNames( )" finds all the resources that have used a given name instance as their superior, reconstructs new names of these resources using the new master, and makes old names aliases of the new names.

If any of the resource whose name has been changed/fixed was a master, this name will be added to the Duplicate Name List 316. All the database entries (e.g, relationships, collection-memberships, etc.) referred to these name instances will be changed to point to their new masters.

Finally, as described in block 234, the method "fixDuplicates( )" is called to fix all database entries, relationships, collection-memberships that are pointing to a duplicate entry to point to the new master. That is, the method "fixDuplicates( )" steps through the Duplicate Name List 316 that has been built during the name reconciliation process and cleans up the CMDB database (including Master/Alias table 308) by replacing all references to obsolete masters with their new masters, and also delete obsolete duplicate master name instances from CMDB. Fixing duplicates may be performed in and for different scenarios. For example, for relationship instances, an alias is replaced with its master to fix possible problems such as a relationship instance already existing, or the source and target of the relationship being the same, etc. For collection-memberships, alias members are replaced with their masters to fix possible problems such as a member existing in the same collection twice, a collection containing itself as a member, etc. For all the foreign key references, an alias is replaced with its master. Thereafter, duplicate name instances are deleted from the main tables. The process then ends at terminator block 236.

Returning to query block 228, if only one valid name is found for a particular resource, then the following steps, as described in block 238, are performed. If the name is a master, then all new name instances, which are returned by the "makeNames( )" method, are added to the Master/Alias table 308 as being aliases of this master name. If the single valid name found is an alias, then the master name of this alias name is the master name of the resource, and all new names are added to the Master/Alias table 308 as the aliases of this master name. The process ends at terminator block 240.

Figure 3:
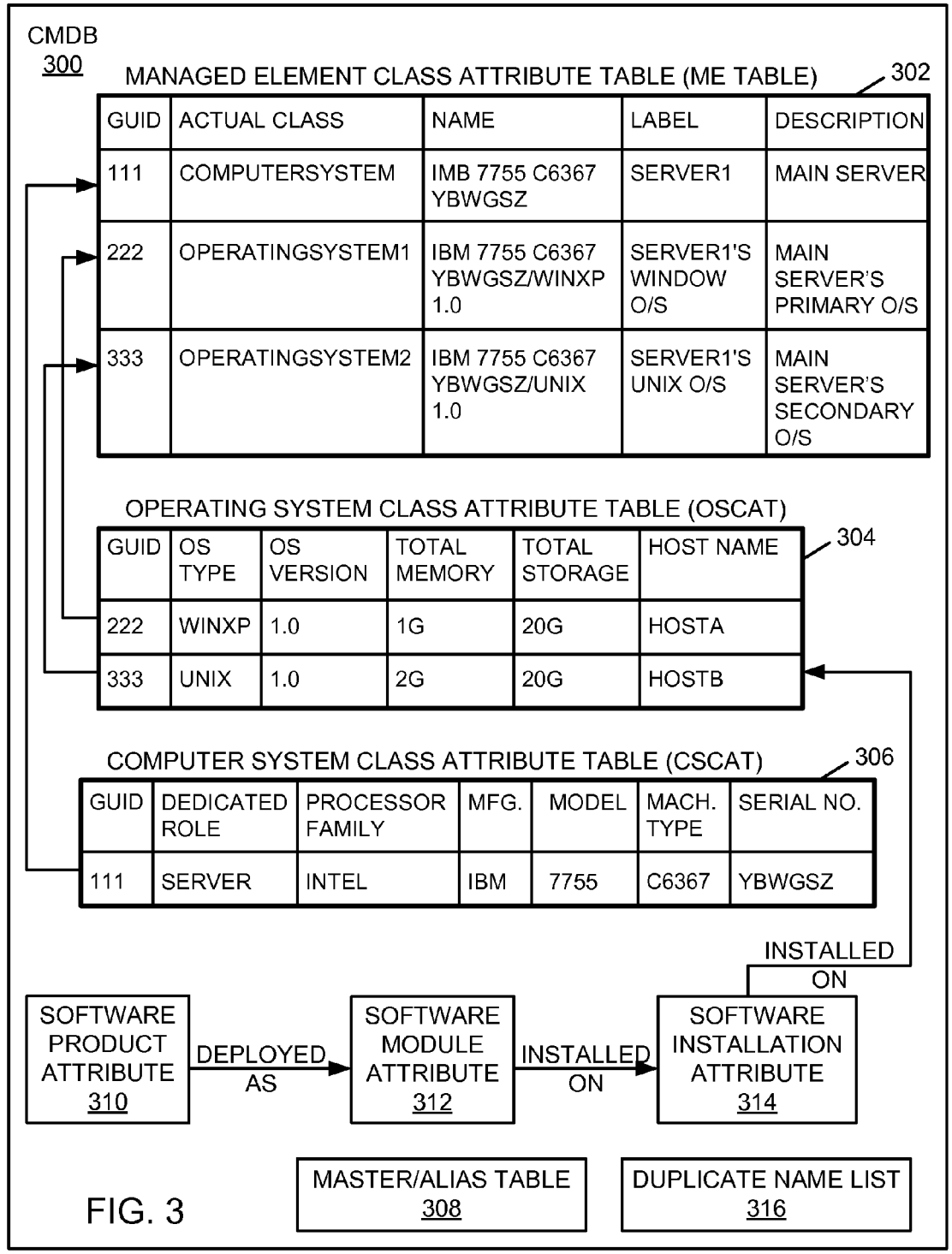
FIG. 3 depicts a novel CMDB with a Master/Alias table, which is used to reconcile names of resources managed by the CMDB.

With reference now to FIG. 3, an exemplary Configuration Management Database (CMDB) 300, as contemplated for novel modification as contemplated by the present invention, is presented. All resource types for resources managed in CMDB 300 are defined within a hierarchy of classes. The top of this hierarchy is a class called "Managed Element." Managed element classes for resources are described in a Managed Element Class Attribute Table ("ME table") 302. Thus, every resource (hardware or software) that is managed by the CMDB (and thus is referred to as a "CMDB resource") is a type of Managed Element (class) and will have a common set of attributes, no matter what the resource is. As shown in ME table 302, these attributes are a Globally Unique Identifier (GUID) (which are numbers created by inputting various attributes of a resource into an algorithm to generate a unique number that identifies a particular resource), an actual class type (name of the resource's class), an identifying name (which, as depicted, may be generated by concatenating various attribute descriptors for a resource), a label (a local pseudonym assigned by a CMDB manager or other local Information Technology (IT) manager), and a description (which is likewise set by a local CMDB or IT manager, and describes the resource's role in an enterprise's IT environment). Some types (or classes) of CMDB resources have additional attributes which vary by class. For example, beside a GUID, an Operating System may have additional attributes like an Operating System (OS) type, an Operating System (OS) version, a host name (of a computer system in which the OS is running), total memory (used by the OS), and total physically attached storage that is available to the OS. These attributes are shown in Operating System Class Attribute Table (OSCAT) 304.

A Computer System may have additional attributes besides a GUID, such as a dedicated role of the computer system, a processor family used by the computer system, the computer system's manufacturer, model, machine type, and serial number, etc., as depicted in a Computer System Class Attribute Table (CSCAT) 306. As depicted, common attributes for resources are stored in one table (ME table 302) and resource-specific attributes are stored in separate tables (OSCAT 304 and CSCAT 306) as shown.

As depicted, the primary keys (PK) (attribute names) of both OSCAT 304 and CSCAT 306 are foreign keys (FK) back into ME table 302. For example, consider the OS resource having a GUID of "222". This OS is shown in ME table 302 as having the name "IBM 775 C6367 YBWGSZ/WinXp 1.0", indicating that it is running on Server1 ("IBM 775 C6367 YBWGSZ"), and is Version 1.0 of Windows XP ("WinXP 1.0"). Thus, the superior of this OS is "IBM 775 C6367 YBWGSZ". If "IBM 775 C6367 YBWGSZ" were to change, then the name of this OS would also need to be changed. Likewise, any software installed attribute 314, software module attribute 312, and/or software product attributes 310 that describe respective installed software, software modules, and/or software programs would also have their names changed if their superior (e.g., OS having the GUID "333") were to change. Note that to avoid over-cluttering FIG. 3, the attributes for the installed software, module and program are not shown. However, it is understood that such resources have a naming structure that is in line with that described and shown for operating systems and computer systems.

When a "new" resource is discovered by CMDB 300, the identity of the "new" resource is compared with entries in the Master/Alias table 308, which reconciles the name of the resource in a manner described in exemplary manner below in FIG. 4. Note that in a preferred embodiment of the present invention, only the Master/Alias table 308 is used in the name correlation processing of the "new" resource, such that other databases in the CMDB 300 (including the ME table 302) are not touched or locked until the very end of the name correlation processing (i.e., fixing duplicate names). By utilizing the Master/Alias table 308 in the herein described manner, concurrency levels between databases in the CMDB 300 are maximized.

The process described in FIGS. 1-3 requires a reconciliation of resource names. That is, in order to create master and alias names for a same resource, and in order to create a correct Master/Alias table 308, and in order to add and clear names from a Duplicate Name List 316, there needs to be a manner to determine that two differently named resources are in fact a same resource. To perform this reconciliation of names, a set of parameters for naming rules needs to be set. As described above, a computer system can be named via one of the following naming rules:

Manufacturer Name, Model/Type, Serial Number. This rule may be referred to as an "MMTS rule".

System Board Universal Unique Identifier (UUID) is a unique identifier number available on some hardware from ROM. A rule that identifies a hardware resource using the UUID may be referred to as a "UUID rule".

Media Access Control (MAC) Addresses are available through the network instrumentation, Domain Name Server (DNS), or operating system. A rule that identifies a hardware resource according to its MAC address may be referred to as a "MAC rule".

Thus, when creating a computer system, the following different naming contexts (rules) may be specified:
Rule 1: MMTS rule
Rule 2: UUID rule
Rule 3: MAC rule
Rule 4: Combination of MMTS rule and UUID rule
Rule 5: Combination of MMTS rule and MAC rule
Rule 6: Combination of UUID rule and MAC rule
Rule 7: Combination of MMTS rule, UUID rule, and MAC rule Referring now to FIG. 4, an example of how different activities affect entries in the Master/Alias table 308, as well as a Manager Element table 404 (which is a simplified version of the ME table 302 described above). As discussed above, the Master/Alias table 308 is a separate table that maintains all of the names of a resource, the master and alias names relationship, and the superior of a name, if there is one. Managed Element table 404 is a separate table that maintains the common attributes of all resources stored in CMDB 300. The elements shown in FIG. 4 will now be used to describe an exemplary set of steps taken in one embodiment of the present invention.

Before discussing the details of the example activities shown in list 402, a review of naming rules for hardware and software resources is useful. For exemplary purposes, assume that hardware resources have three naming rules, listed in descending priority as naming rules 0-2. Naming "rule 0" names a hardware resource according to that resource's Manufacturer Name (M), the Model/Type (MT) of the resource, and the Serial number (S) of that resource (to arrive at the MMTS of the resource). The MMTS information is generally available from the hardware resource itself, or through system calls. Naming "rule 1" for hardware uses a Universal Unique Identifier (UUID), which is a universally recognized identification number that is available for some hardware, and is typically found on a Read-Only Memory (ROM) that is associated with that hardware resource. Naming "rule 2" identifies and names a hardware resource according to a Media Access Control (MAC) address that is being used by the resource.

Software resources may also have prioritized naming rules. For example, software naming "rule 0" may be a software Universal Unique Identifier (UUID), which is a software version of the hardware UUID described above. A software naming "rule 1" may describe a software resource by concatenating a version/type number with the name of the computer system on which the software is running. A software naming "rule 2" may be based on the name of the computer system on which the software is running, plus the name of the host system (e.g., a virtual system).

Consider now Activity 1 (addCS(MMTS1)) shown in list 402. A resource is identified as a computer system with the name "MMTS1". The name "MMTS1" suggests that this resource was named using the naming "rule 0" (as stated in the Master/Alias table 308 under the "naming rule priority" column). When MMTS1 is named, a check is made of Master/Alias table 308 to see if MMTS1, or any alias names for MMTS1, have been created in the past. Assuming that this hardware resource has not been named by the CMDB before, then "MMTS1" is assigned to be the "master" name for this computer system, and the name MMTS1 is placed in the Master/Alias table 308 and the Managed Element table 404 as the master name for this computer system.

Next, consider Activity 2 (addOS(superior=MMTS1, OS=(WinXP))). This suggests that an operating system (OS), which is running on the computer system previously identified as MMTS1 (the superior for naming context) is named "WinXP". Using the software naming "rule 1," this OS is named for the computer system in which it is running (MMTS1) and the type of OS (WinXP) to achieve the name "MMTS1/WinXP". Since this is the first time that this operating system has been named, in one embodiment it will assume and retain the title of master, even if subsequent naming events of the same resource use a higher priority naming rule. That is, in one embodiment, if a newly discovered resource is able to provide parameters for multiple naming rules, then the naming rule with the highest priority will be used. Thereafter, if the same resource is rediscovered under a different name, then the original name will continue to be the master name, even if the new different name used a higher priority naming rule. Since "MMTS1/WinXP" is the master name for this OS resource, this name is shown in Master/Alias table 308 as the master name (of itself), and is placed in the name of the Managed Element table 404 as the name to be used when referencing this OS resource.

Next, consider Activity 3, in which "another" resource is discovered and named by the CMDB. This resource is an OS that has MMTS1 as its superior (computer system in which it runs and thus will control its concatenated name), and is a Windows XP OS. However, this OS is also identified as "Sysguid1," and is thus placed in Master/Alias table 308. As shown in the naming rule column of Master/Alias table 308, the name "Sysguid1" was derived from software naming "rule 0," using the UUID (or Global UID) for the software. Since software naming "rule 0" has the highest priority in naming software, there is no superior context for this name (as indicated by the lack of an entry in the column "Superior" in Master/Alias table 308. However, since the CMDB knows that "MMTS1/WinXP" and "Sysguid1" are the same OS (since they were contemporaneously named for the same resource during Activity 3), then "Sysguid1" is assigned the status of being an alias of the master name "MMTS/WinXP". As such, the name "Sysguid1" is never entered into the Managed Element table 404, since it is already known that "Sysguid1" can never be a master name for this resource.

Next, consider Activity 4, in which "another" OS is added to the CMDB. Using the software naming "rule 2," this resource is named "MMTS1/hostA". Since there are no cross-references in either the Master/Alias table 308 or Managed Element table 404 to indicate that "MMTS1/hostA" is the name of an already recognized/configured/named OS, then (initially) the name "MMTS/hostA" is placed in Master/Alias table 308 as a master name for this resource, and is also initially entered into Managed Element table 404. (As will be shown below, "MMTS/hostA" will later be demoted to being an alias name in Activity 12.)

Next, consider Activity 5, in which a "new" computer system is added to the CMDB. Using hardware naming "rule 1," this system is named "UUID1". Since there is nothing in Master/Alias table 308 to indicate otherwise, UUID1 is initially declared to be a master name, and thus is entered into the Master/Alias table 308 and Managed Element table 404 as such. As the strikethroughs suggest however, this declaration will be revoked later.

Next consider Activity 6, in which a "new" OS is added to the CMDB. Using software naming "rule 1," this OS is named "UUID/WinXP". Since "UUID/WinXP" has not been referenced before, then it is entered in both the Master/Alias table 308 and the Managed Element table 404 as being a master name for this OS.

Referring now to Activity 7, a "new" OS is added to the CMDB. Two names can be derived, using software naming "rule 1" (which uses the name of the computer system (UUID1) as a superior and the name of the OS (WinXP) to derive the name "UUID1/WinXP") and software naming "rule 0" (which uses only the UUID of the OS to derive the name "Sysguid1"). At this point, the CMDB has enough "intelligence" to recognize two facts: 1) "Sysguid1" and "UUID1/WinXP" are the same OS; and 2) "UUID1/WinXP" and "MMTS1/WinXP" are the same OS. That is, the CMDB knows that "Sysguid1" and "UUID1/WinXP" are the same OS because they were created simultaneously for the same resource. Knowing that "UUID1/WinXP" and "MMTS1/WinXP" are the same OS, however, is a bit less trivial. First, the CMDB knows that "Sysguid1" is the same resource as "MMTS1/WinXP", as was discovered during Activity 3. Since "Sysguid1" and "UUID1/WinXP" are the same, then "UUID1/WinXP" and "MMTS1/WinXP" are also the same resource. Therefore, the name "UUID1/WinXP" is deemed to be an alias of "MMTS1/WinXP". This results in 1) changing the master name of "UUID1/WinXP" from "UUID/WinXP" to "MMTS1/WinXP" in the Master/Alias table 308, and removing the name "UUID1/WinXP" from the Managed Element table 404 (since "UUID1/WinXP" cannot be a master name).

Continuing now to Activity 8, a "new" OS is added to the CMDB using the software naming "rule 2", resulting in the name "UUID/hostA". Initially, there is no reference for this name in either the Master/Alias table 308 or the Managed Element table 404, and so "UUID/hostA" is added to both tables and initially assumed to be a master name for a newly discovered resource.

Referring now to Activity 9, two names for a "new" computer system are derived using hardware naming "rule 0" (resulting in the name "MMTS1") and the hardware naming "rule 1" (resulting in the name "UUID1"). Since these names were derived contemporaneously for the same hardware resource, then the CMDB knows that they are the same resource. This allows the following to occur. First, since it has previously been established that "MMTS1" is a master name, then anywhere the name "UUID1" is used, the name "UUID1" can (and should be) replaced with the name "MMTS1". Thus, as shown in Master/Alias table 308, "MMTS1" is now shown as the master of "UUID1"; "MMTS1" is the superior for the OS that was previously had a master name "UUID1/WinXP" (which master name is now replaced with "MMTS1/WinXP" in the Master/Alias table 308); and the name "UUID", "UUID1/WinXP" and "UUID1/hostA" can safely be removed from the Managed Element table 404.

Continuing on to Activity 10, a "new" OS name is derived ("MMTS1/hostB"), using the software naming "rule 1". (Actually, the name for this OS was initially "UUID1/hostB", but since the CMDB knows that UUID1 is actually MMTS1, then the CMDB automatically made the adjustment.) Since "MMTS1/hostB" is heretofore unknown, then it is added to both the Master/Alias table 308 and the Managed Element table 404 as a master name for this OS.

At Activity 11, two names are derived for another OS using the software naming "rule 2" ("MMTS1/hostB") and the software naming "rule 0" ("Sysguid1"). (Again, the name "MMTS1/hostB" was initially "UUID1/hostB", but the CMDB "knew" to change it accordingly.) Initially, the Master/Alias table 308 and Managed Element table 404 receive entries showing "MMTS1/hostB" as being for a newly acquired resource, and thus is master name. However, since it has previously been determined that "Sysguid1" and "MMTS1/WinXP" are the same OS installation, and since "Sysguid1" and "MMTS1/hostB" are the same (having been derived contemporaneously), then the CMDB knows that "MMTS1/hostB" is the same as "MMTS1/WinXP", resulting in "MMTS1/hostB" being relegated to being an alias of the master name "MMTS1/WinXP", and "MMTS1/hostB" being removed from the Managed Element table 404.

Finally, Activity 12 derives two names for an OS. One name is derived using the software naming "rule 0" ("MMTS1/WinXP"—which was originally "UUID1/WinXP" but was automatically converted to the name "MMTS1/WinXP"). The other name is derived using the software naming "rule 2" ("MMTS1/hostA"—which was originally "UUID1/hostA" but was automatically converted to the name "MMTS1/hostA"). Since the CMDB can thus determine that "MMTS1/hostA" and "MMTS1/WinXP" are the same (having been derived contemporaneously for the same resource), and since "MMTS1/WinXP" has been previously deemed to be a master name, then the name "MMTS1/hostA" (also derived during Activity 4) is relegated to being an alias name of "MMTS1/WinXP". Therefore, "MMTS1/hostA" is removed from the Managed Element table 404.

Following the scenario described in FIG. 4, the same computer system resource has been discovered and created three times, but reconciled down to a single master name. Similarly, the same OS has been discovered and created nine times, but is reconciled down to a single master name. By keeping the Managed Element table 404 up to date while separate from the Master/Alias table 308, a great improvement in efficiency and overhead management is achieved, since the resources "know" only their master name, which is updated by the Managed Element table 404. Note that while only a single set of table has been illustrated, in a real environment the CMDB will support many (hundreds or more) tables and their associated resources. Thus, the efficiency provided as described becomes even more significant when scaled up accordingly.

As shown in FIG. 5, a table 500 lists various scenarios that different name instances of a computer system may be created by different management products, and indicates whether CMDB can correlate these different name instances. That is, table 500 depicts a chart showing which scenarios will succeed and which will fail in resource naming correlations. Scenario (1, 2, 3) means that three separate management products have created the same computer system. The first management product uses naming context 1 (using the MMTS rule), the second management product uses naming context 2 (using the UUID rule), and the third management product uses naming context 3 (using the MAC rule). Because they used mutually exclusive naming contexts, there is no correlation possible. The next scenario (1, 2, 4) is possible to correlate, but requires some fix of duplicates.

In creating a resource, if each Management Product only provides one mutually exclusive naming context of the resource, CMDB will not be able to correlate different name instances of this resource. The more correlating naming attributes are provided in creating a resource, the better and faster the CMDB can perform the correlation.

To facilitate an effective master-alias name correlation and to minimize the need of fixing duplicates, Management Products should always provide as many naming/correlating attributes as possible in creating a resource. If it is feasible, resources that contain more naming context should be added before those contain only a single naming context.

Of course, there can always be manual correlation, where an administrator simply indicates that two mutually exclusive naming contexts are the same. This will be supported and will perform the same fixDuplicates processing based on that knowledge.

Figure 6:
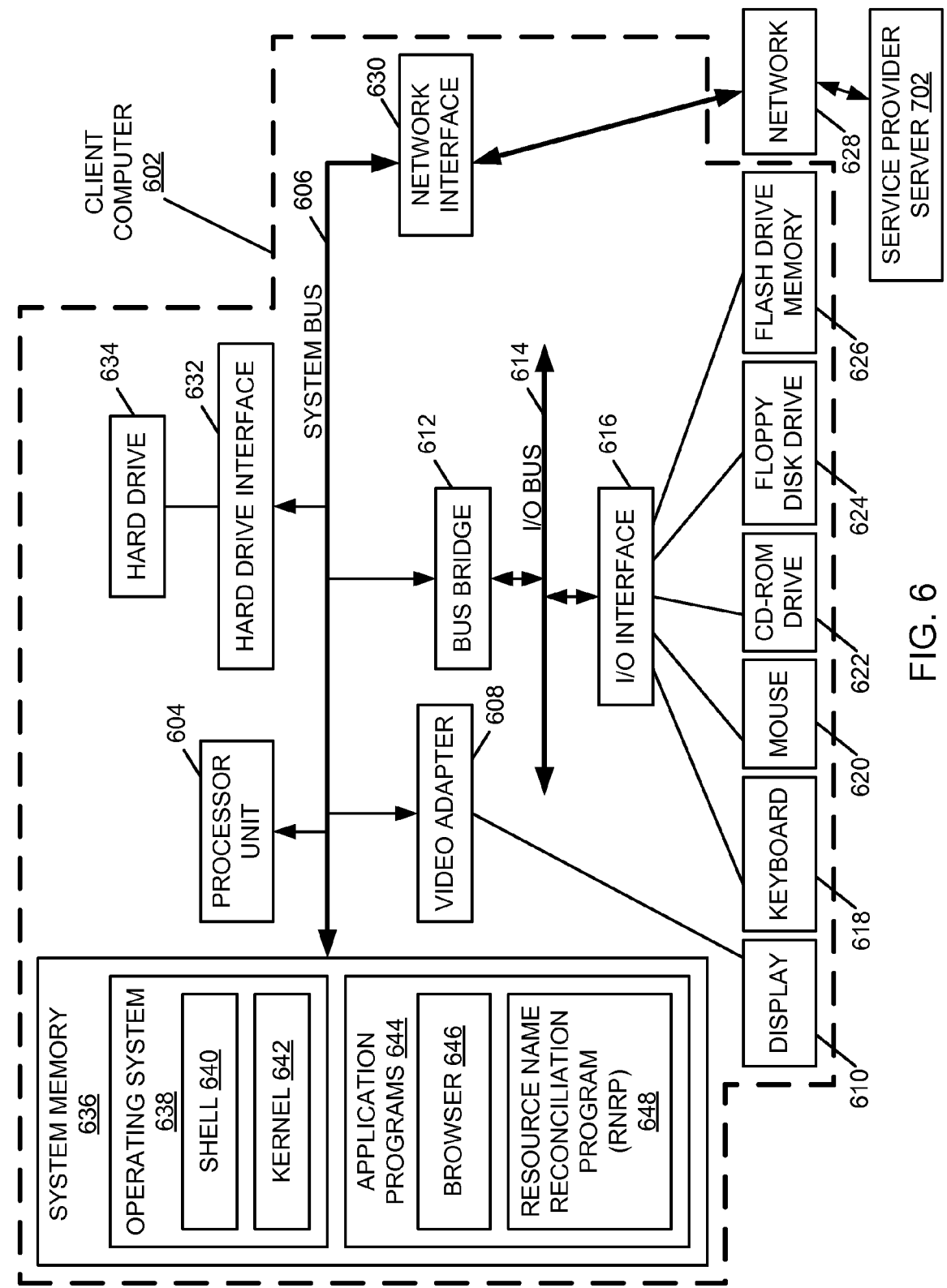
FIG. 6 depicts an exemplary client computer in which the present invention may implemented.

With reference now to FIG. 6, there is depicted a block diagram of an exemplary client computer 602, in which the present invention may be utilized. Client computer 602 includes a processor unit 604 that is coupled to a system bus 606. A video adapter 608, which drives/supports a display 610, is also coupled to system bus 606. System bus 606 is coupled via a bus bridge 612 to an Input/Output (I/O) bus 614. An I/O interface 616 is coupled to I/O bus 614. I/O interface 616 affords communication with various I/O devices, including a keyboard 618, a mouse 620, a Compact Disk-Read Only Memory (CD-ROM) drive 622, a floppy disk drive 624, and a flash drive memory 626. The format of the ports connected to I/O interface 616 may be any known to those skilled in the art of computer architecture, including but not limited to Universal Serial Bus (USB) ports.

Client computer 602 is able to communicate with a service provider server 702 via a network 628 using a network interface 630, which is coupled to system bus 606. Network 628 may be an external network such as the Internet, or an internal network such as an Ethernet or a Virtual Private Network (VPN). Using network 628, client computer 602 is able to use the present invention to access service provider server 702.

A hard drive interface 632 is also coupled to system bus 606. Hard drive interface 632 interfaces with a hard drive 634. In a preferred embodiment, hard drive 634 populates a system memory 636, which is also coupled to system bus 606. Data that populates system memory 636 includes client computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present invention will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a browser 646. Browser 646 includes program modules and instructions enabling a World Wide Web (WWW) client (i.e., client computer 602) to send and receive network messages to the Internet using HyperText Transfer Protocol (HTTP) messaging, thus enabling communication with service provider server 702.

Application programs 644 in client computer 602's system memory also include a Resource Name Reconciliation Program (RNRP) 648, which includes code for implementing the processes described in FIGS. 1-5. In one embodiment, client computer 602 is able to download RNRP 648 from service provider server 702.

The hardware elements depicted in client computer 602 are not intended to be exhaustive, but rather are representative to highlight essential components required by the present invention. For instance, client computer 602 may include alternate memory storage devices such as magnetic cassettes, Digital Versatile Disks (DVDs), Bernoulli cartridges, and the like. These and other variations are intended to be within the spirit and scope of the present invention.

Figure 7:
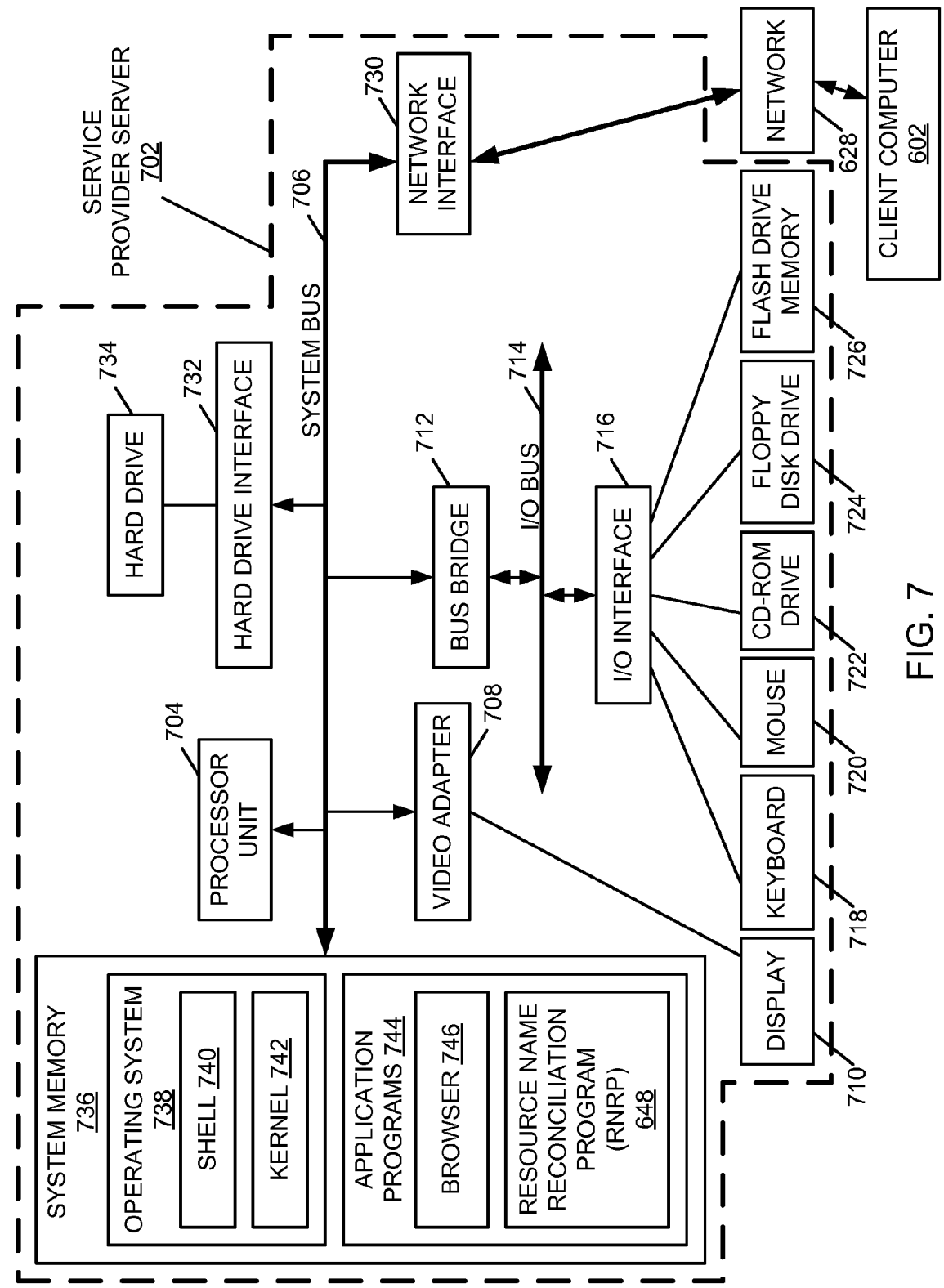
FIG. 7 illustrates an exemplary server from which software for executing the present invention may be deployed and/or implemented for the benefit of a user of the client computer shown in FIG. 7.

As noted above, RNRP 648 can be downloaded to client computer 602 from service provider server 702, shown in exemplary form in FIG. 7. Service provider server 702 includes a processor unit 704 that is coupled to a system bus 706. A video adapter 708 is also coupled to system bus 706. Video adapter 708 drives/supports a display 710. System bus 706 is coupled via a bus bridge 712 to an Input/Output (I/O) bus 714. An I/O interface 716 is coupled to I/O bus 714. I/O interface 716 affords communication with various I/O devices, including a keyboard 718, a mouse 720, a Compact Disk-Read Only Memory (CD-ROM) drive 722, a floppy disk drive 724, and a flash drive memory 726. The format of the ports connected to I/O interface 716 may be any known to those skilled in the art of computer architecture, including but not limited to Universal Serial Bus (USB) ports.

Service provider server 702 is able to communicate with client computer 602 via network 628 using a network interface 730, which is coupled to system bus 706. Access to network 628 allows service provider server 702 to execute and/or download RNRP 648 to client computer 602.

System bus 706 is also coupled to a hard drive interface 732, which interfaces with a hard drive 734. In a preferred embodiment, hard drive 734 populates a system memory 736, which is also coupled to system bus 706. Data that populates system memory 736 includes service provider server 702's operating system 738, which includes a shell 740 and a kernel 742. Shell 740 is incorporated in a higher level operating system layer and utilized for providing transparent user access to resources such as application programs 744, which include a browser 746, and a copy of RNRP 648 described above, which can be deployed to client computer 602.

The hardware elements depicted in service provider server 702 are not intended to be exhaustive, but rather are representative to highlight essential components required by the present invention. For instance, service provider server 702 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 702 performs all of the functions associated with the present invention (including execution of RNRP 648), thus freeing client computer 602 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Note further that instructions found in each embodiment of a computer-usable medium may be deployed from a service provider to a user. This deployment may be made in an "on-demand" basis as described herein.

Software Deployment

As described above, in one embodiment, the processes described by the present invention, including the functions of RNRP 648, are performed by service provider server 702. Alternatively, RNRP 648 and the method described herein, and in particular as shown and described in FIGS. 1-5, can be deployed as a process software from service provider server 702 to client computer 602. Still more particularly, process software for the method so described may be deployed to service provider server 702 by another service provider server (not shown).

Figure 8A:
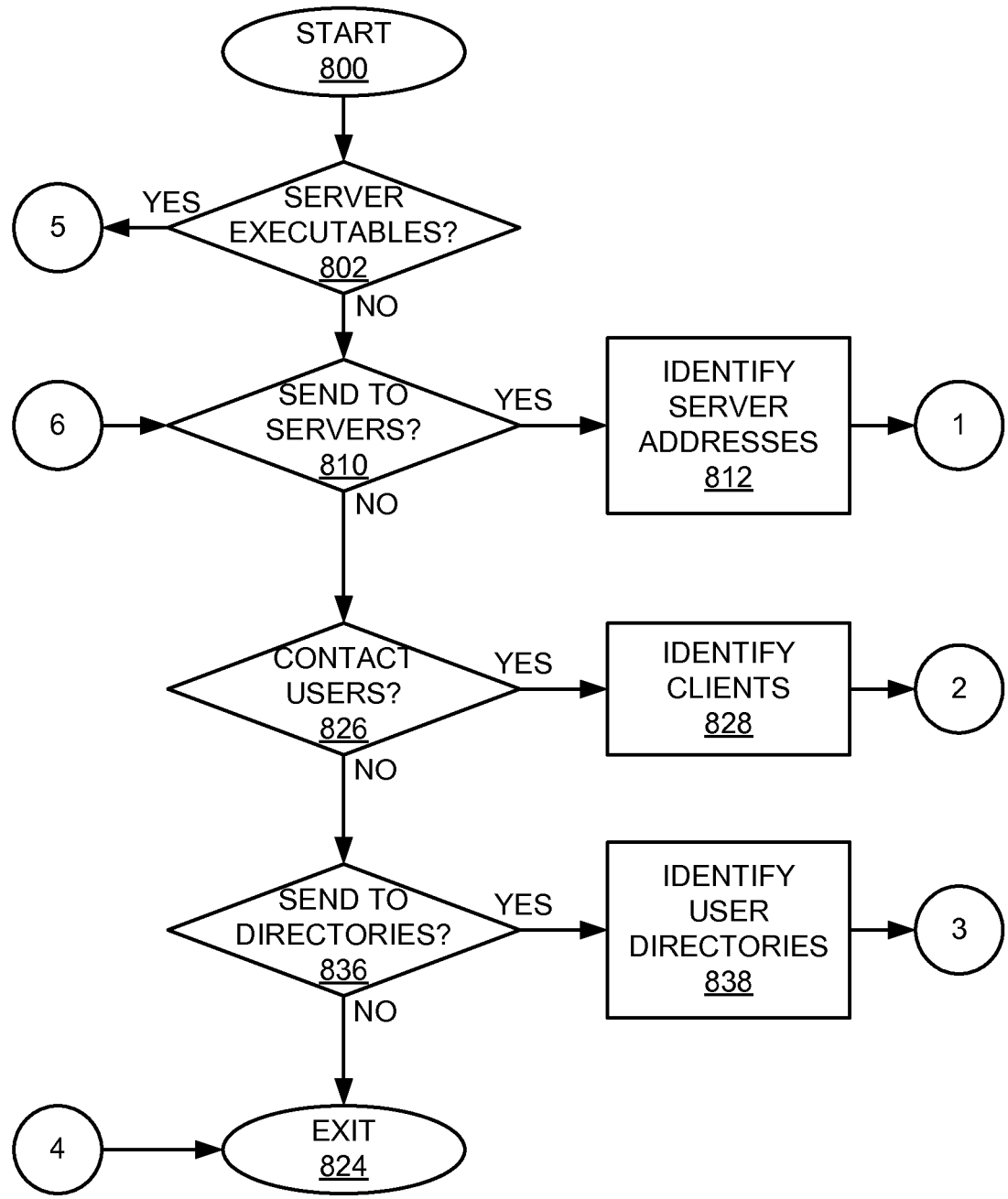
FIGS. 8a-b show a flow-chart of steps taken to deploy software capable of executing the steps shown and described in FIGS. 1-5.
Figure 8B:
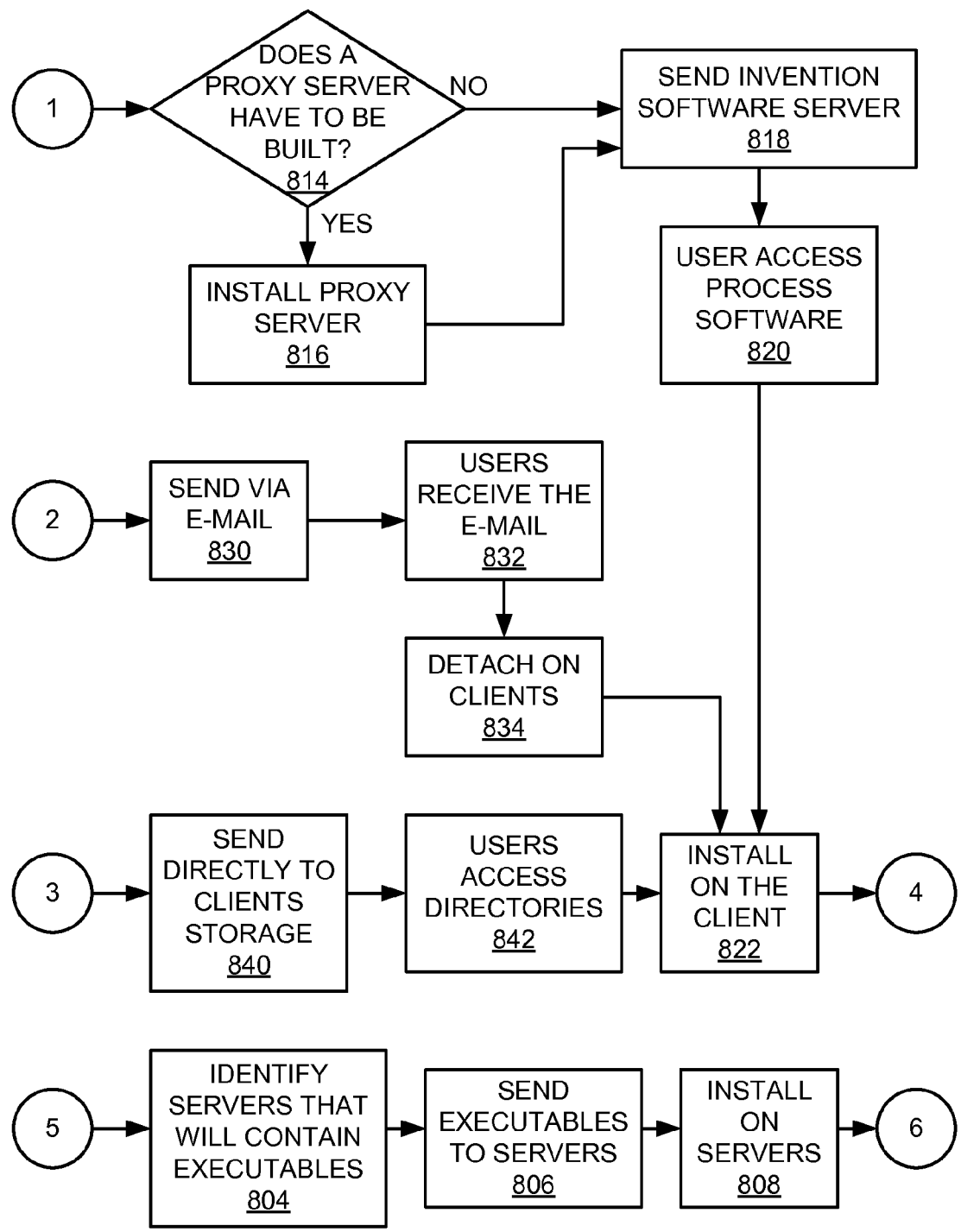

Referring then to FIGS. 8*a-b*, step 800 begins the deployment of the process software. The first thing is to determine if there are any programs that will reside on a server or servers when the process software is executed (query block 802). If this is the case, then the servers that will contain the executables are identified (block 804). The process software for the server or servers is transferred directly to the servers' storage via File Transfer Protocol (FTP) or some other protocol or by copying though the use of a shared file system (block 806). The process software is then installed on the servers (block 808).

Next, a determination is made on whether the process software is to be deployed by having users access the process software on a server or servers (query block 810). If the users are to access the process software on servers, then the server addresses that will store the process software are identified (block 812).

A determination is made if a proxy server is to be built (query block 814) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 816). The process software is sent to the servers either via a protocol such as FTP or it is copied directly from the source files to the server files via file sharing (block 818). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 820). Another embodiment is to have the servers automatically copy the process software to each client and then run the installation program for the process software at each client computer. The user executes the program that installs the process software on his client computer (block 822) then exits the process (terminator block 824).

In query step 826, a determination is made whether the process software is to be deployed by sending the process software to users via e-mail. The set of users where the process software will be deployed are identified together with the addresses of the user client computers (block 828). The process software is sent via e-mail to each of the users' client computers (block 830). The users then receive the e-mail (block 832) and then detach the process software from the e-mail to a directory on their client computers (block 834). The user executes the program that installs the process software on his client computer (block 822) then exits the process (terminator block 824).

Lastly a determination is made as to whether the process software will be sent directly to user directories on their client computers (query block 836). If so, the user directories are identified (block 838). The process software is transferred directly to the user's client computer directory (block 840). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 842). The user executes the program that installs the process software on his client computer (block 822) and then exits the process (terminator block 824).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN.

When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
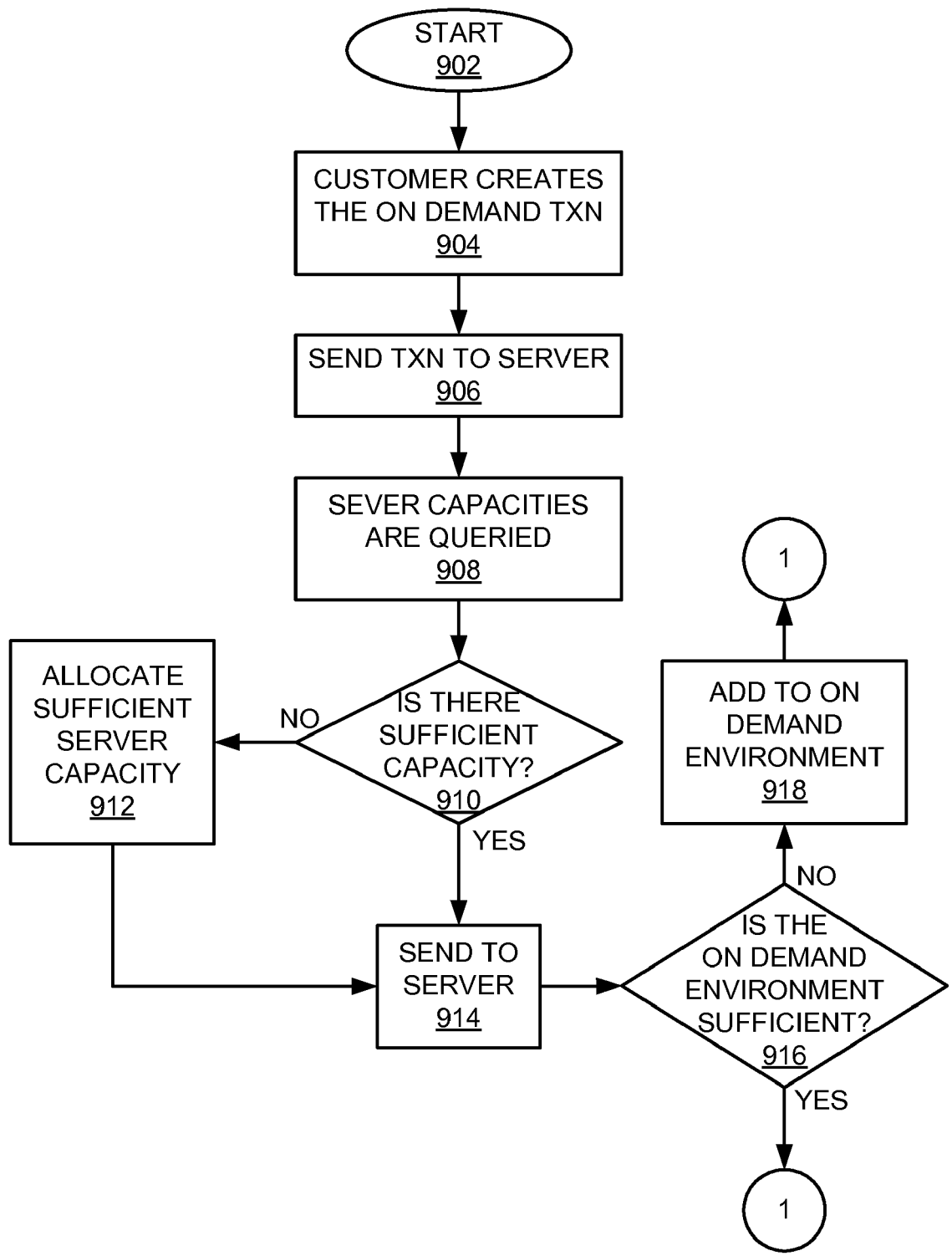
FIGS. 9a-b show a flow-chart showing steps taken to execute the steps shown and described in FIGS. 1-5 using an on-demand service provider.
Figure 9B:
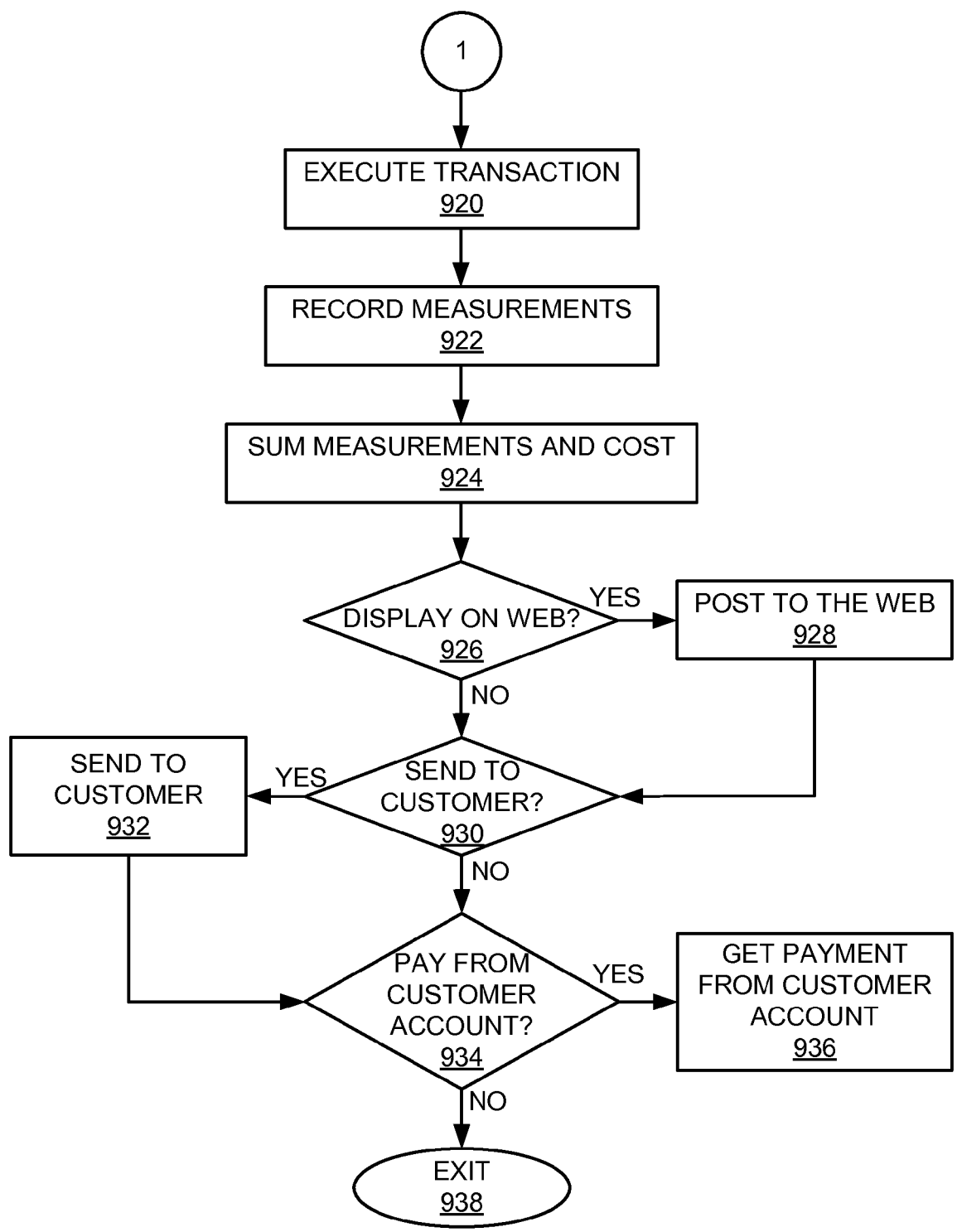

With reference now to FIGS. 9a-b, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit (CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient Available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

The present invention thus provides for a computer-implementable method, system and computer-usable medium for name reconciliation of computer resources. In one embodiment, the method includes generating a list of all valid names for a resource that is managed by a resource configuration database, wherein the resource belongs to a class of resources that have multiple naming rules, and wherein the valid names have a validity priority order. The resource configuration database may be a Configuration Management Database (CMDB) as defined by ITIL. The method may also include the steps of assigning one of the valid names a status of being a master name for the resource, assigning a status of alias name to each non-master name in the list of valid names, reconstructing a name of any resource that has used an alias name by replacing an alias name with a master name, and deleting, from a duplicate name list in the CMDB, any name instances that had previously used an alias name.

In another embodiment, the inventive method includes the steps of: determining if a resource, which is managed by a resource configuration database, has multiple valid names; and in response to determining that the resource has multiple valid names, delegating one of the valid names to be a master name for the resource, and delegating any remaining valid names to be alias names for the resource. The master name may be derived using a higher rule that had a higher priority than any rule used to create the alias names. The resource may be a hardware resource, wherein the higher priority rule is based on a Manufacturer number, Model/Type number, and Serial number identifier (MMTS); a Universal Unique Identifier (UUID) for the resource; or a Media Access Control (MAC) address of the resource. The method may also include the steps of identifying two computer resource name instances as having been created using two different naming rules; and determining that the two computer resource names are for a same computer resource if one or more naming contexts in the two different naming rules have a same identification value.

In another embodiment, the inventive method for reconciling names, of enterprise computer resources, in a Configuration Management Database (CMDB), includes the steps of creating a resource that belongs to a class that has multiple naming rules; in response to determining that more than one set of naming attributes is provided by the multiple naming rules, generating a set of valid names, in a priority order, for the resource; and correlating different names for the resource by, in accordance with the priority order, assigning one name for the resource to be a master name and assigning all other names for the resource to be alias names. The method may further include the steps of checking, in the CMDB, if multiple name instances of a same resource already exist in a CMDB database but have not been labeled as aliases of a master name for a same resource; and in response to determining that the same resource has not been labeled as an alias of the master name, selecting one valid name for the resource to be a master name and selecting all other valid names to be alias names for the resource. A master name may be a first name assigned to a resource, or the master name may be a name created by a rule that has been predetermined to have a higher priority over rules that created the alias names. The method may further include the steps of, in response to determining that a duplicate name instance was a superior naming context of an other resource stored in a CMDB table, constructing a valid name for said other resource using a newly selected master name. The method may also include the steps of cleaning up one or more CMDB databases by replacing all references to alias names with new master names, and removing all duplicate entries for resources from core tables in the CMDB.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method, comprising:
    managing resources within a configuration management database (CMDB) via a master/alias table and a managed element table;
    discovering, via the CMDB, a resource for management by the CMDB;
    generating, in response to discovery of the resource, a plurality of different resource names for the discovered resource using a plurality of prioritized naming rules; and
    determining that the discovered resource already exists in the CMDB, where at least one of the master/alias table and the managed element table comprise a resource instance name that matches at least one of the generated plurality of different resource names for the discovered resource.

2. The method of claim 1, further comprising:
    determining that at least one of the generated plurality of different resource names for the discovered resource comprises a higher-priority resource instance name than the resource instance name based upon priorities associated with the plurality of prioritized naming rules; and
    replacing the resource instance name within the at least one of the master/alias table and the managed element table with the higher-priority resource instance name.

3. The method of claim 2, further comprising:
  adding the generated plurality of different resource names for the discovered resource other than the higher-priority resource instance name as alias names for the higher-priority resource instance name within to the master/alias table; and
  removing any identified duplicate resource instance names that match the generated plurality of different resource names for the discovered resource other than the higher-priority resource instance name from the managed element table.

4. The method of claim 1, where determining that the discovered resource already exists in the CMDB, where at least one of the master/alias table and the managed element table comprise the resource instance name that matches the at least one of the generated plurality of different resource names for the discovered resource comprises:
  determining whether at least one superior naming context for the discovered resource already exists within at least one of the master/alias table and the managed element table, where a computer system name comprises the superior naming context relative to an operating system name and the operating system name comprises the superior naming context relative to an application name;
  determining, in response to determining that a plurality of superior naming contexts for the discovered resource already exists within at least one of the master/alias table and the managed element table, that the plurality of superior naming contexts represent the resource; and
  generating an error in response to determining that the superior naming context for the discovered resource does not exist within at least one of the master/alias table and the managed element table.

5. The method of claim 1, where determining that the discovered resource already exists in the CMDB where at least one of the master/alias table and the managed element table comprise the resource instance name that matches the at least one of the generated plurality of different resource names for the discovered resource comprises:
  determining, based upon the plurality of different resource names for the discovered resource, that the master/alias table comprises a plurality of valid names for the discovered resource; and
  further comprising determining, via the master/alias table, whether the plurality of valid names for the discovered resource comprises alias names relative to a single master resource name.

6. The method of claim 5, further comprising selecting the single master resource name for the discovered resource in response to determining that the plurality of valid names for the discovered resource comprises the alias names relative to the single master resource name.

7. The method of claim 5, further comprising in response to determining that the plurality of valid names for the discovered resource comprises the alias names relative to more than one master resource name:
  selecting a highest-priority resource name from the plurality of different resource names relative to other ones of the plurality of different resource names based upon a highest-priority naming rule associated with the plurality of prioritized naming rules;
  replacing the more than one master resource name within at least one of the master/alias table and the managed element table with the selected highest-priority resource name; and
  making each of the more than one master resource name an alias of the selected highest-priority resource name.

8. The method of claim 7, further comprising:
  identifying the managed resources within the master/alias table with any of the more than one master resource name as a master name;
  reconstructing a new name for each of the identified managed resources using the selected highest-priority resource name as the master name; and
  making each of the more than one master resource name an alias of the selected highest-priority resource name for each of the identified managed resources.

9. A system, comprising:
  at least one memory that stores a master/alias table and a managed element table; and
  a processor programmed to:
    manage resources via the master/alias table and the managed element table;
    discover a resource for management by the processor;
    generate, in response to discovery of the resource, a plurality of different resource names for the discovered resource using a plurality of prioritized naming rules; and
    determine that the discovered resource already exists in the memory, where at least one of the master/alias table and the managed element table comprise a resource instance name that matches at least one of the generated plurality of different resource names for the discovered resource.

10. The system of claim 9, where the processor is further programmed to:
  determine that at least one of the generated plurality of different resource names for the discovered resource comprises a higher-priority resource instance name than the resource instance name based upon priorities associated with the plurality of prioritized naming rules; and
  replace the resource instance name within the at least one of the master/alias table and the managed element table with the higher-priority resource instance name.

11. The system of claim 10, where the processor is further programmed to:
  add the generated plurality of different resource names for the discovered resource other than the higher-priority resource instance name as alias names for the higher-priority resource instance name within to the master/alias table; and
  remove any identified duplicate resource instance names that match the generated plurality of different resource names for the discovered resource other than the higher-priority resource instance name from the managed element table.

12. The system of claim 9, where, in being programmed to determine that the discovered resource already exists in the memory, where at least one of the master/alias table and the managed element table comprise the resource instance name that matches the at least one of the generated plurality of different resource names for the discovered resource, the processor is programmed to:
  determine whether at least one superior naming context for the discovered resource already exists within at least one of the master/alias table and the managed element table, where a computer system name comprises the superior naming context relative to an operating system name and the operating system name comprises the superior naming context relative to an application name;
  determine, in response to determining that a plurality of superior naming contexts for the discovered resource already exists within at least one of the master/alias table and the managed element table, that the plurality of
superior naming contexts represent the resource; and
generate an error in response to determining that the superior naming context for the discovered resource does not exist within at least one of the master/alias table and the managed element table.

13. The system of claim 9, where, in being programmed to determine that the discovered resource already exists in the memory, where at least one of the master/alias table and the managed element table comprise the resource instance name that matches the at least one of the generated plurality of different resource names for the discovered resource, the processor is programmed to:
   determine, based upon the plurality of different resource names for the discovered resource, that the master/alias table comprises a plurality of valid names for the discovered resource; and
   the processor is further programmed to determine, via the master/alias table, whether the plurality of valid names for the discovered resource comprises alias names relative to a single master resource name.

14. The system of claim 13, where the processor is further programmed to select the single master resource name for the discovered resource in response to determining that the plurality of valid names for the discovered resource comprises the alias names relative to the single master resource name.

15. The system of claim 13, where, in response to determining that the plurality of valid names for the discovered resource comprises the alias names relative to more than one master resource name, the processor is further programmed to:
   select a highest-priority resource name from the plurality of different resource names relative to other ones of the plurality of different resource names based upon a highest-priority naming rule associated with the plurality of prioritized naming rules;
   replace the more than one master resource name within at least one of the master/alias table and the managed element table with the selected highest-priority resource name; and
   make each of the more than one master resource name an alias of the selected highest-priority resource name.

16. The system of claim 15, where the processor is further programmed to:
   identify the managed resources within the master/alias table with any of the more than one master resource name as a master name;
   reconstruct a new name for each of the identified managed resources using the selected highest-priority resource name as the master name; and
   make each of the more than one master resource name an alias of the selected highest-priority resource name for each of the identified managed resources.

17. A computer program product comprising a computer readable storage medium including computer readable program code, where the computer readable program code when executed on a computer causes the computer to:
   manage resources within a configuration management database (CMDB) via a master/alias table and a managed element table;
   discover, via the computer, a resource for management by the CMDB;
   generate, in response to discovery of the resource, a plurality of different resource names for the discovered resource using a plurality of prioritized naming rules; and
   determine that the discovered resource already exists in the CMDB where at least one of the master/alias table and the managed element table comprise a resource instance name that matches at least one of the generated plurality of different resource names for the discovered resource.

18. The computer program product of claim 17, where the computer readable program code when executed on the computer further causes the computer to:
   determine that at least one of the generated plurality of different resource names for the discovered resource comprises a higher-priority resource instance name than the resource instance name based upon priorities associated with the plurality of prioritized naming rules; and
   replace the resource instance name within the at least one of the master/alias table and the managed element table with the higher-priority resource instance name.

19. The computer program product of claim 18, where the computer readable program code when executed on the computer further causes the computer to:
   add the generated plurality of different resource names for the discovered resource other than the higher-priority resource instance name as alias names for the higher-priority resource instance name within to the master/alias table; and
   remove any identified duplicate resource instance names that match the generated plurality of different resource names for the discovered resource other than the higher-priority resource instance name from the managed element table.

20. The computer program product of claim 17, where, in causing the computer to determine that the discovered resource already exists in the CMDB, where at least one of the master/alias table and the managed element table comprise the resource instance name that matches the at least one of the generated plurality of different resource names for the discovered resource, the computer readable program code when executed on the computer causes the computer to:
   determine whether at least one superior naming context for the discovered resource already exists within at least one of the master/alias table and the managed element table, where a computer system name comprises the superior naming context relative to an operating system name and the operating system name comprises the superior naming context relative to an application name;
   determine, in response to determining that a plurality of superior naming contexts for the discovered resource already exists within at least one of the master/alias table and the managed element table, that the plurality of superior naming contexts represent the resource; and
   generate an error in response to determining that the superior naming context for the discovered resource does not exist within at least one of the master/alias table and the managed element table.

21. The computer program product of claim 17, where, in causing the computer to determine that the discovered resource already exists in the CMDB, where at least one of the master/alias table and the managed element table comprise the resource instance name that matches the at least one of the generated plurality of different resource names for the discovered resource, the computer readable program code when executed on the computer causes the computer to:
   determine, based upon the plurality of different resource names for the discovered resource, that the master/alias table comprises a plurality of valid names for the discovered resource; and
   the computer readable program code when executed on the computer further causes the computer to determine, via the master/alias table, whether the plurality of valid names for the discovered resource comprises alias names relative to a single master resource name.

22. The computer program product of claim 21, where the computer readable program code when executed on the computer further causes the computer to select the single master resource name for the discovered resource in response to determining that the plurality of valid names for the discovered resource comprises the alias names relative to the single master resource name.

23. The computer program product of claim 21, where, in response to determining that the plurality of valid names for the discovered resource comprises the alias names relative to more than one master resource name, the computer readable program code when executed on the computer further causes the computer to:

select a highest-priority resource name from the plurality of different resource names relative to other ones of the plurality of different resource names based upon a highest-priority naming rule associated with the plurality of prioritized naming rules;

replace the more than one master resource name within at least one of the master/alias table and the managed element table with the selected highest-priority resource name; and make each of the more than one master resource name an alias of the selected highest-priority resource name.

24. The computer program product of claim 23, where the computer readable program code when executed on the computer further causes the computer to:

identify the managed resources within the master/alias table with any of the more than one master resource name as a master name;

reconstruct a new name for each of the identified managed resources using the selected highest-priority resource name as the master name; and make each of the more than one master resource name an alias of the selected highest-priority resource name for each of the identified managed resources.

\* \* \* \* \*